US012756488B2

(12) United States Patent
Kobayashi et al.

(10) Patent No.: US 12,756,488 B2
(45) Date of Patent: Oct. 6, 2026

(54) TEST SYSTEM AND EVALUATION METHOD

(71) Applicant: ANRITSU CORPORATION, Kanagawa (JP)

(72) Inventors: Takeshi Kobayashi, Kanagawa (JP); Keisuke Takizawa, Kanagawa (JP); Hirofumi Suganuma, Kanagawa (JP); Ikuya Otani, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 262 days.

(21) Appl. No.: 18/652,071

(22) Filed: May 1, 2024

(65) Prior Publication Data

US 2024/0405902 A1 Dec. 5, 2024

(30) Foreign Application Priority Data

May 24, 2023 (JP) ................................ 2023-085674

(51) Int. Cl.
*H04B 17/391* (2015.01)

(52) U.S. Cl.
CPC ................................ *H04B 17/3912* (2015.01)

(58) Field of Classification Search
CPC .................................................. H04B 17/3912
See application file for complete search history.

(56) References Cited

U.S. PATENT DOCUMENTS

| | | | | |
|---|---|---|---|---|
| 7,398,056 B1 * | 7/2008 | Ebert | H04B 17/0085 | 455/67.14 |
| 8,331,869 B2 * | 12/2012 | Foegelle | H04B 17/0082 | 455/115.2 |
| 9,288,696 B2 * | 3/2016 | Szini | H04W 24/06 | |
| 9,614,627 B2 * | 4/2017 | Yu | H04B 7/024 | |
| 2004/0088628 A1 * | 5/2004 | Poutanen | H04B 17/0087 | 714/776 |
| 2008/0215300 A1 * | 9/2008 | Sarkkinen | H04B 17/3912 | 703/4 |

(Continued)

OTHER PUBLICATIONS

"ACE RNX Channel Emulator" Product Catalog, Mar. 1, 2018.

*Primary Examiner* — Brenda H Pham
(74) *Attorney, Agent, or Firm* — McDonald Hopkins LLC

(57) ABSTRACT

A test system includes an actual propagation path characteristic calculation unit that calculates estimation characteristics, at analysis target timings, of propagation path characteristics of channels constituting an actual propagation path, a channel model parameter calculation unit that calculates channel model parameters characterizing statistical properties of the estimation characteristics, a simulation propagation path characteristic generation unit that generates simulation propagation path characteristics according to the channel model parameters, a simulation channel capacity calculation unit that calculates a channel capacity of the simulation propagation path characteristics, an actual propagation path channel capacity calculation unit that calculates a channel capacity of the estimation characteristics at some analysis target timings among the analysis target timings, and a channel capacity evaluation unit that calculates an evaluation indicator for evaluating a degree of similarity between the channel capacity of the simulation propagation path characteristics and the channel capacity of the estimation characteristics.

8 Claims, 5 Drawing Sheets

(56) References Cited

U.S. PATENT DOCUMENTS

| | | | | |
|---|---|---|---|---|
| 2014/0303954 | A1 * | 10/2014 | Slutzky | G06F 30/367<br>703/13 |
| 2019/0013849 | A1 * | 1/2019 | Kobayashi | H04B 7/0617 |

* cited by examiner

TEST SYSTEM AND EVALUATION METHOD

TECHNICAL FIELD

The present invention relates to a test system and an evaluation method for evaluating a channel model.

BACKGROUND ART

When a mobile phone terminal is tested, the demodulation performance in a fading environment is evaluated by supplying a signal obtained by passing a downlink signal output by a base station simulator through a propagation path simulator to a mobile phone terminal. As a channel model used in the propagation path simulator, a channel model defined in a test standard is often used. On the other hand, there is also a demand for evaluating the demodulation performance of the mobile phone terminal using a channel model having propagation path characteristics close to an actual propagation path environment.

In general, as a method for simulating the actual propagation path environment, a method for reproducing the propagation path characteristics measured in the actual propagation path environment is known.

In the "Field-to-Lab" (for example, see Non-Patent Document 1) of the ACE RNX Channel Emulator, a downlink signal transmitted by an actual base station that travels through an actual propagation path is collected, and the data is analyzed to extract the propagation path characteristics of the actual propagation path, and an instantaneous value of the propagation path characteristics of the actual propagation path is replayed as it is to perform a test on a demodulation unit of the mobile phone terminal. By replaying the actual propagation path characteristic as it is, "Field-to-Lab" can faithfully reproduce the actual propagation path characteristics.

However, since the existing "Field-to-Lab" disclosed in Non-Patent Document 1 replays the actual propagation path characteristics without change, the test time of the mobile phone terminal is determined depending on the data collection time. Since antennas at the time of data collection are different from actual antennas of the mobile phone terminal, there is no significant meaning in replaying the instantaneous value of the propagation path characteristics itself.

RELATED ART DOCUMENT

Non-Patent Document

[Non-Patent Document 1] "ACE RNX Channel Emulator" Product Catalog, Mar. 1, 2018

DISCLOSURE OF THE INVENTION

Problem that the Invention is to Solve

On the other hand, a method for parameterizing statistical properties of the measured propagation path characteristics and transforming the statistical properties into a channel model, and then simulating the propagation path environment is considered, which is different from the method disclosed in Non-Patent Document 1. In this method, it is desirable to evaluate whether or not the channel model can simulate the propagation path characteristics in the actual propagation path environment with sufficient accuracy.

In a case of evaluating the demodulation performance of the mobile phone terminal, the throughput is generally measured. The evaluation of whether or not the channel model is appropriate can be performed by a "deviation" from the throughput to be originally achieved, which is the most straightforward. However, since the factors for determining the throughput itself include, in addition to the propagation path characteristics, how much radio resource is allocated for communication in a measurement target, the throughput itself is not appropriate as an indicator for evaluating the degree of similarity between the propagation path characteristics of the channel model that simulates the actual propagation path characteristics and the actual propagation path characteristics.

The present invention has been made to solve the above-described problems in the related art, and an object of the present invention is to provide a test system and an evaluation method capable of evaluating a degree of similarity between simulation propagation path characteristics of a channel model and actual propagation path characteristics.

Means for Solving the Problem

In order to solve the above problems, an aspect of the present invention relates to a test system including: an actual propagation path characteristic calculation unit (21) that uses IQ data, which is obtained from a downlink signal transmitted from a network-side transmission/reception device (100) and which is output from an antenna device (10) that receives the downlink signal in an environment of an actual propagation path (110), to calculate estimation characteristics, at a plurality of analysis target timings, of propagation path characteristics of one or more channels constituting the actual propagation path; a channel model parameter calculation unit (22) that calculates channel model parameters characterizing statistical properties of the actual propagation path characteristics; a simulation propagation path characteristic generation unit (30) that generates a plurality of simulation propagation path characteristics according to the channel model parameters; a simulation channel capacity calculation unit (24) that calculates a simulation channel capacity of the plurality of simulation propagation path characteristics; an actual propagation path channel capacity calculation unit (25) that calculates a channel capacity of the actual propagation path characteristics at some analysis target timings among the plurality of analysis target timings; and a channel capacity evaluation unit (28) that calculates an evaluation indicator for evaluating a degree of similarity between the simulation channel capacity and the actual propagation path channel capacity.

With this configuration, the test system according to the aspect of the present invention can generate the simulation propagation path characteristics from the channel model parameters characterizing the statistical properties of the actual propagation path characteristics without the restriction of the acquisition time of the downlink signal from the base station.

In addition, the test system according to the aspect of the present invention can perform a test on a device under test in a form in which the statistical propagation path characteristics of the actual propagation path are reproduced by using the simulation propagation path characteristics.

In addition, the test system according to the aspect of the present invention can evaluate the degree of similarity between the simulation propagation path characteristics of the channel model and the actual propagation path characteristics by using the channel capacity. That is, the test system according to the aspect of the present invention can evaluate the validity of the process of calculating the parameters of the channel model by using the channel capacity as the indicator.

In the test system according to the aspect of the present invention, the channel capacity evaluation unit may include a probability distribution calculation unit (26) that calculates a probability distribution of the simulation channel capacity and a probability distribution of the actual propagation path channel capacity, and a degree-of-similarity evaluation unit (27) that calculates a degree of similarity between the probability distribution of the simulation channel capacity and the probability distribution of the actual propagation path channel capacity as the evaluation indicator.

In the test system according to the aspect of the present invention, the channel capacity evaluation unit may calculate an average value or/and a standard deviation of the simulation channel capacity, and an average value or/and a standard deviation of the actual propagation path channel capacity as the evaluation indicators.

In the test system according to the aspect of the present invention, the degree-of-similarity evaluation unit may calculate the evaluation indicator based on a difference between an average value of the probability distribution of the simulation channel capacity and an average value of the probability distribution of the channel capacity, and the evaluation indicator based on a difference between a width of the probability distribution of the simulation channel capacity and a width of the probability distribution of the actual propagation path channel capacity.

With these configurations, the test system according to the aspect of the present invention can appropriately evaluate the degree of similarity between the simulation propagation path of the channel model characteristics and the actual propagation path characteristics.

In the test system according to the aspect of the present invention, the width of the probability distribution of the simulation channel capacity may be a difference between a maximum value and a minimum value of a 95% confidence interval of the probability distribution of the simulation channel capacity, and the width of the probability distribution of the actual propagation path channel capacity.

With this configuration, the test system according to the aspect of the present invention can appropriately evaluate the degree of similarity between the simulation propagation path characteristics of the channel model and the actual propagation path characteristics.

Another aspect of the present invention relates to an evaluation method including: an actual propagation path characteristic calculation step (S2) of using IQ data, which is obtained from a downlink signal transmitted from a network-side transmission/reception device (100) and which is output from an antenna device (10) that receives the downlink signal in an environment of an actual propagation path (110), to calculate estimation characteristics, at a plurality of analysis target timings, of propagation path characteristics of one or more channels constituting the actual propagation path; a channel model parameter calculation step (S3) of calculating channel model parameters characterizing statistical properties of the estimation characteristics of the actual propagation path; a simulation propagation path characteristic generation step (S4) of generating a plurality of simulation propagation path characteristics according to the channel model parameters; a simulation channel capacity calculation step (S5) of calculating a simulation channel capacity of the plurality of simulation propagation path characteristics; an actual propagation path channel capacity calculation step (S6) of calculating a channel capacity of the estimation characteristics of the actual propagation path at some analysis target timings among the plurality of analysis target timings; and a channel capacity evaluation step (S7, S8) of calculating an evaluation indicator for evaluating a degree of similarity between the simulation channel capacity and the actual propagation path channel capacity.

In the evaluation method according to the aspect of the present invention, the channel capacity evaluation step may include a probability distribution calculation step (S7) of calculating a probability distribution of the simulation channel capacity and a probability distribution of the actual propagation path channel capacity, and a degree-of-similarity evaluation step (S8) of calculating a degree of similarity between the probability distribution of the simulation channel capacity and the probability distribution of the actual propagation path channel capacity as the evaluation indicator.

In addition, in the evaluation method according to the aspect of the present invention, in the channel capacity evaluation step, an average value or/and a standard deviation of the simulation channel capacity, and an average value or/and a standard deviation of the actual propagation path channel capacity may be calculated as the evaluation indicators.

In the evaluation method according to the aspect of the present invention, in the degree-of-similarity evaluation step, the evaluation indicator based on a difference between an average value of the probability distribution of the simulation channel capacity and an average value of the probability distribution of the channel capacity, and the evaluation indicator based on a difference between a width of the probability distribution of the simulation channel capacity and a width of the probability distribution of the actual propagation path channel capacity may be calculated.

In the evaluation method according to the aspect of the present invention, the width of the probability distribution of the simulation channel capacity may be a difference between a maximum value and a minimum value of a 95% confidence interval of the probability distribution of the simulation channel capacity, and the width of the probability distribution of the actual propagation path channel capacity.

Advantage of the Invention

The present invention provides the test system and the evaluation method capable of evaluating the degree of similarity between the simulation propagation path characteristics of the channel model and the actual propagation path characteristics.

BEST MODE FOR CARRYING OUT THE INVENTION

Hereinafter, embodiments of a test system and an evaluation method according to the present invention will be described with reference to the drawings. The test system and the evaluation method according to the embodiment of the present invention use a channel capacity, which is an upper limit of a theoretical throughput, as an indicator for evaluating a degree of similarity between simulation propagation path characteristics of a channel model and actual propagation path characteristics.

Figure 1:
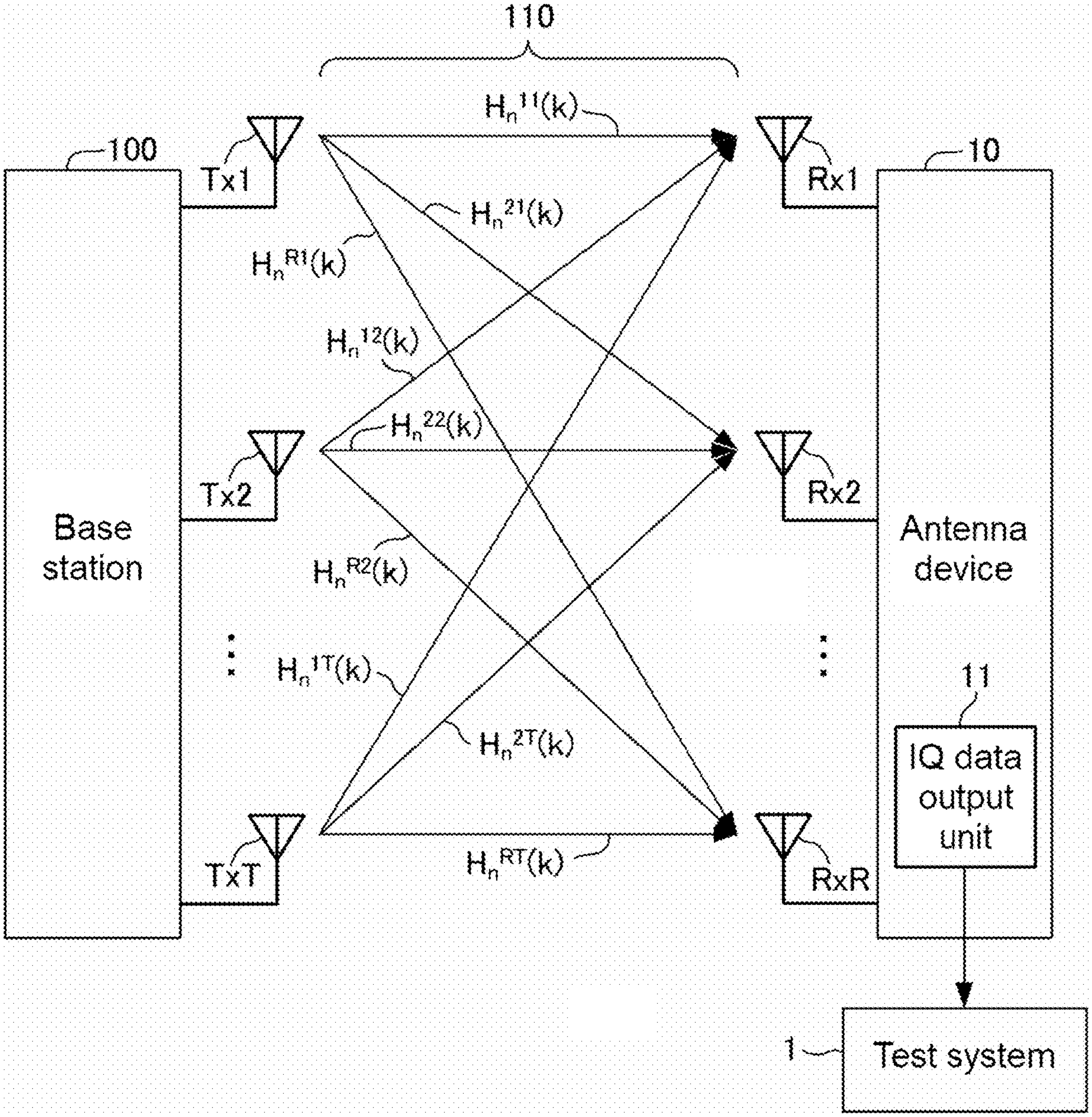
FIG. 1 is a diagram schematically illustrating an environment of an actual propagation path between a base station and an antenna device.

FIG. 1 is a diagram schematically illustrating an environment of an actual propagation path 110 between a base station 100, which is an example of a network-side transmission/reception device, and an antenna device 10. In FIG. 1, data communication between the base station 100 and the antenna device 10 is performed by using a plurality of subcarriers by an orthogonal frequency division multiplexing (OFDM) modulation method.

The antenna device 10 receives downlink signals transmitted from T antennas Tx1 to TxT of the base station 100 in an environment of the actual propagation path 110 formed of one or more channels. For example, the antenna device 10 is an air monitor or a mobile phone terminal. The antenna device 10 includes R antennas Rx1 to RxR that receive the downlink signals transmitted from the antennas Tx1 to TxT of the base station 100 as reception signals, and an IQ data output unit 11.

Here, the number T of the antennas Tx1 to TXT of the base station 100 and the number R of the antennas Rx1 to RxR of the antenna device 10 are each an integer of 1 or more, and a value of T×R is the number of channels of the actual propagation path 110.

The IQ data output unit 11 performs a reception process such as amplification, frequency transformation, and analog-digital transformation on the R reception signals received by the antennas Rx1 to RxR. Further, the IQ data output unit 11 is configured to demodulate the R reception signals subjected to the reception process to generate R sets of I component baseband signals and Q component baseband signals, which are orthogonal to each other. In the present specification, the I component baseband signal and the Q component baseband signal are collectively referred to as "IQ data".

$H_n^{11}(k)$, $H_n^{21}(k)$, . . . , $H_n^{R1}(k)$, $H_n^{12}(k)$, $H_n^{22}(k)$, . . . , $H_n^{R2}(k)$, . . . , $H_n^{1T}(k)$, $H_n^{2T}(k)$, . . . , and $H_n^{RT}(k)$ in FIG. 1 are elements of a channel matrix H(k,n) represented by Expression (1) described later.

Figure 2:
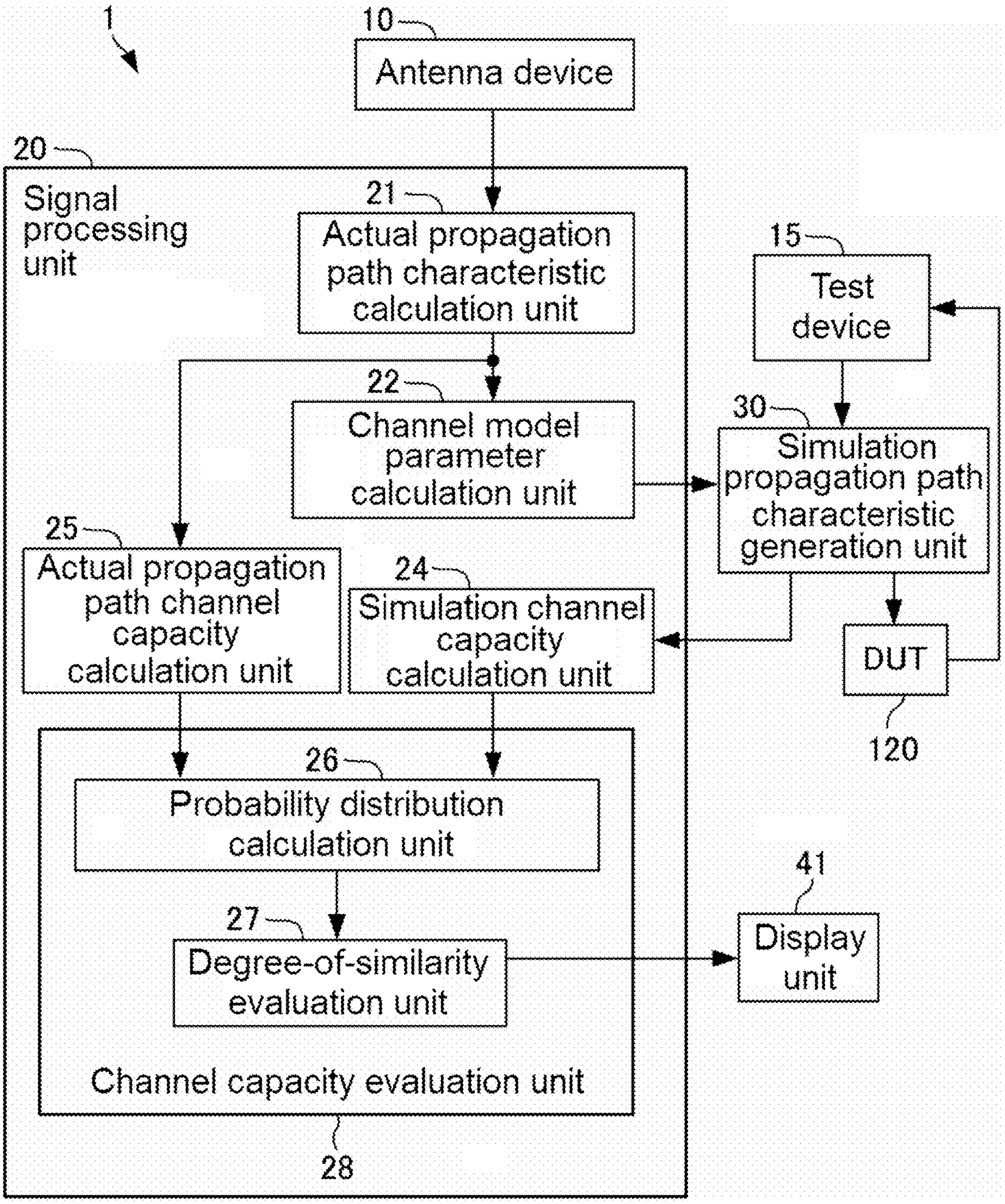
FIG. 2 is a block diagram illustrating a configuration of a test system according to an embodiment of the present invention.

As illustrated in FIG. 2, the test system 1 according to the present embodiment includes a test device 15, a signal processing unit 20, a simulation propagation path characteristic generation unit 30, and a display unit 41.

The test device 15 includes a function of a base station simulator that generates a downlink signal required to test a device under test (DUT) 120, transmits the downlink signal to the DUT 120 via a simulation propagation path, receives an uplink signal transmitted from the DUT 120, and performs a process required for the test. The test device 15 performs, for example, a test of the demodulation performance of the DUT 120. The simulation propagation path between the test device 15 and the DUT 120 is formed by the simulation propagation path characteristic generation unit 30 described later. The DUT 120 is, for example, a mobile phone terminal capable of communication in a multiple input multiple output (MIMO) method.

The signal processing unit 20 includes an actual propagation path characteristic calculation unit 21, a channel model parameter calculation unit 22, a simulation channel capacity calculation unit 24, an actual propagation path channel capacity calculation unit 25, and a channel capacity evaluation unit 28.

The actual propagation path characteristic calculation unit 21 is configured to use the IQ data output from the IQ data output unit 11 of the antenna device 10 to calculate estimation characteristics $\hat{H}_n^{ij}(k)$, at a plurality of analysis target timings $t_n$, of propagation path characteristics $H_n^{ij}(k)$ of one or more channels constituting the actual propagation path 110. Here, $H_n^{ij}(k)$ represents each element of the channel matrix H(k,n) of the actual propagation path 110 in Expression (1). i is an index of the R antennas Rx1 to RxR of the antenna device 10, and j is an index of the T antennas Tx1 to TXT of the base station 100.

That is, R=1 and T=1 represent a single input single output (SISO) method, R≥2 and T=1 represent a single input multiple output (SIMO) method, R=1 and T≥2 represent a multiple input single output (MISO) method, and R≥2 and T≥2 represent the MIMO method.

$$H(k,n)=\begin{bmatrix} H_n^{11}(k) & H_n^{12}(k) & \cdots & H_n^{1T}(k) \\ H_n^{21}(k) & H_n^{22}(k) & \cdots & H_n^{2T}(k) \\ \vdots & \vdots & \ddots & \vdots \\ H_n^{R1}(k) & H_n^{R2}(k) & \cdots & H_n^{RT}(k) \end{bmatrix} \quad (1)$$

In Expression (1), k is an index in a frequency direction, and is, for example, an index of a subcarrier number. Here, in a case where Δf is a frequency interval of the subcarriers, a frequency $f_x$ of each subcarrier is k×Δf. In addition, n is an index in a time direction, and is, for example, an index of an OFDM symbol number. Here, k is an integer of 0 to K−1, and n is an integer of 0 to N−1.

The IQ data output from the IQ data output unit 11 of the antenna device 10 includes a reference signal (RS). For example, in a case of a 5G NR standard, reference signals such as a channel state information reference signal (CSI-RS), a demodulation reference signal (DM-RS), a tracking reference signal (TRS), and a phase tracking reference signal (PT-RS) are prepared.

The actual propagation path characteristic calculation unit 21 is configured to calculate the estimation characteristics $\hat{H}_n^{ij}(k)$ of the propagation path characteristics $H_n^{ij}(k)$ from the known RS signals included in the downlink signal transmitted from the T antennas Tx1 to TxT of the base station 100 and the RS signals of each channel included in the IQ data of the R set outputs from the IQ data output unit 11. The estimation characteristics $\hat{H}_n^{ij}(k)$ include information on an amplitude fluctuation amount and a phase fluctuation amount of the RS signals of the IQ data obtained from the reception signal received by an i-th antenna Rxi with respect to the known RS signals transmitted by a j-th antenna Txj. For example, in a case of a 5G NR standard, the actual propagation path characteristic calculation unit 21 uses the RS signals such as the CSI-RS, the DM-RS, the TRS, and the PT-RS included in the IQ data and the corresponding known RS signal patterns, for the calculation of the estimation characteristics $\hat{H}_n^{ij}(k)$. Here, $\hat{H}_n^{ij}(k)$ represents each element of a matrix $\hat{H}$(k,n), which is the estimation of the channel matrix H(k,n) of the actual propagation path 110 in Expression (1), and is expressed as in Expression (2).

$$\hat{H}(k,n)=\begin{bmatrix}\hat{H}_n^{11}(k) & \hat{H}_n^{12}(k) & \dots & \hat{H}_n^{1T}(k)\\ \hat{H}_n^{21}(k) & \hat{H}_n^{22}(k) & \dots & \hat{H}_n^{2T}(k)\\ \vdots & \vdots & \ddots & \vdots\\ \hat{H}_n^{R1}(k) & \hat{H}_n^{R2}(k) & \dots & \hat{H}_n^{RT}(k)\end{bmatrix} \tag{2}$$

The channel model parameter calculation unit 22 is configured to calculate channel model parameters characterizing the statistical properties of the estimation characteristics $H\hat{}_n{}^{ij}(k)$ calculated by the actual propagation path characteristic calculation unit 21. That is, the channel model parameter calculation unit 22 calculates the channel model parameters by using the estimation characteristics $H\hat{}_n{}^{ij}(k)$ within a period in which the statistical properties are not changed among the estimation characteristics $H\hat{}_n{}^{ij}(k)$ calculated by the actual propagation path characteristic calculation unit 21. The channel model parameters calculated by the channel model parameter calculation unit 22 are input to the simulation propagation path characteristic generation unit 30.

The simulation propagation path characteristic generation unit 30 includes, for example, a known channel model such as a tapped delay line model (TDL model) or a clustered delay line model (CDL model). The simulation propagation path characteristic generation unit 30 is configured to generate a plurality of simulation propagation path characteristics $P_{n1}{}^{ij}(k1)$ according to the channel model parameters calculated by the channel model parameter calculation unit 22.

Here, $P_{n1}{}^{ij}(k1)$ represents each element of a channel matrix P(k1, n1) in Expression (3). Each of the indexes i and j is the same as in Expression (1). k1 is an index in a frequency direction, and a frequency indicated by k1 may not necessarily have a one-to-one correspondence with the frequency indicated by the index k in Expression (1). Similarly, n1 is an index in a time direction, and a timing indicated by n1 may not necessarily have a one-to-one correspondence with the analysis target timing $t_n$ indicated by the index n in Expression (1).

$$P(k1,n1)=\begin{bmatrix}P_{n1}^{11}(k1) & P_{n1}^{12}(k1) & \dots & P_{n1}^{1T}(k1)\\ P_{n1}^{21}(k1) & P_{n1}^{22}(k1) & \dots & P_{n1}^{2T}(k1)\\ \vdots & \vdots & \ddots & \vdots\\ P_{n1}^{R1}(k1) & P_{n1}^{R2}(k1) & \dots & P_{n1}^{RT}(k1)\end{bmatrix} \tag{3}$$

For example, the channel model parameter calculation unit 22 calculates a "K factor", a "power delay profile (PDP)", an "antenna correlation matrix", and the like as the channel model parameters of the TDL model.

Further, the simulation propagation path characteristic generation unit 30 functions as a propagation path simulator that forms the simulation propagation path having the generated simulation propagation path characteristics $P_{n1}{}^{ij}(k1)$ between the test device 15 and the DUT 120.

As illustrated in Expression (4), the simulation channel capacity calculation unit 24 is configured to calculate a simulation channel capacity $C_p$ of the plurality of simulation propagation path characteristics $P_{n1}{}^{ij}(k1)$ generated by the simulation propagation path characteristic generation unit 30.

$$C_p(k1,n1,\rho)=\sum_{i=1}^{min(T,R)}\log_2\left(1+\frac{\rho}{T}\Lambda_i^{(k1,n1)}\right) \tag{4}$$

ρ is linear SNR for one antenna of antenna device 10

R is the number of antennas of antenna device 10

T is the number of antennas of base station 100

$$\Lambda_i^{(k1,n1)}$$

is i-th eigenvalue of $P_{norm}(k1, n1)\, P_{norm}(k1, n1)^{\dagger}$ i={1, 2, . . . , min{T, R}}

$P_{norm}(k1, n1)$ is matrix obtained by normalizing signal level of each element of P(k1, n1) at RMS level common to all elements of P(k1, n1)

$P_{norm}(k1, n1)^{\dagger}$ is conjugate transposed matrix of $P_{norm}(k1, n1)$ As illustrated in Expression (5), the actual propagation path channel capacity calculation unit 25 is configured to calculate a channel capacity $C_0$ of the estimation characteristics $H\hat{}_n{}^{dj}(k)$ at some plurality of analysis target timings $t_n$.

$$C_0(k,n,\rho)=\sum_{i=1}^{min(T,R)}\log_2\left(1+\frac{\rho}{T}\lambda_i^{(k,n)}\right) \tag{5}$$

ρ is lenear SNR for one antenna of antenna device 10

R is th number of antennas of antenna device 10

T is the number of antennas of base station 100

$$\lambda_i^{(k,n)}$$

is i-th eigenvalue of $\hat{H}_{norm}(k,n)\hat{H}_{norm}(k,n)^{\dagger}$ i={1, 2, . . . , min{T, R}}

$\hat{H}_{norm}(k,n)$ is matrix obtained by normalizing signal level of each element of $\hat{H}(k1, n1)$ at RMS level common to all elements of $\hat{H}(k1, n1)$ $\hat{H}_{norm}(k,n)^{\dagger}$ is conjugate transposed matrix of $\hat{H}_{norm}(k1, n1)$ The channel capacity evaluation unit 28 is configured to calculate an evaluation indicator for evaluating a degree of similarity between the simulation channel capacity $C_p$ calculated by the simulation channel capacity calculation unit 24 and the channel capacity $C_0$ calculated by the actual propagation path channel capacity calculation unit 25. The channel capacity evaluation unit 28 includes, for example, a probability distribution calculation unit 26 and a degree-of-similarity evaluation unit 27.

The probability distribution calculation unit 26 is configured to calculate the probability distribution of the simulation channel capacity $C_p$ calculated by the simulation channel capacity calculation unit 24 and the probability distribution of the channel capacity $C_0$ calculated by the actual propagation path channel capacity calculation unit 25.

The degree-of-similarity evaluation unit 27 is configured to calculate the degree of similarity between the probability distribution of the simulation channel capacity $C_p$ calculated by the probability distribution calculation unit 26 and the probability distribution of the channel capacity $C_0$ calculated by the probability distribution calculation unit 26, as the evaluation indicator. For example, the degree-of-similarity evaluation unit 27 calculates a value based on a difference between an average value of the probability distribution of the simulation channel capacity $C_p$ and an average value of the probability distribution of the channel capacity $C_0$, as the evaluation indicator. The degree-of-similarity evaluation unit 27 calculates a value based on a difference between a width of the probability distribution of the simulation channel capacity $C_p$ and a width of the probability distribution of the channel capacity $C_0$, as the evaluation indicator.

Figure 3:
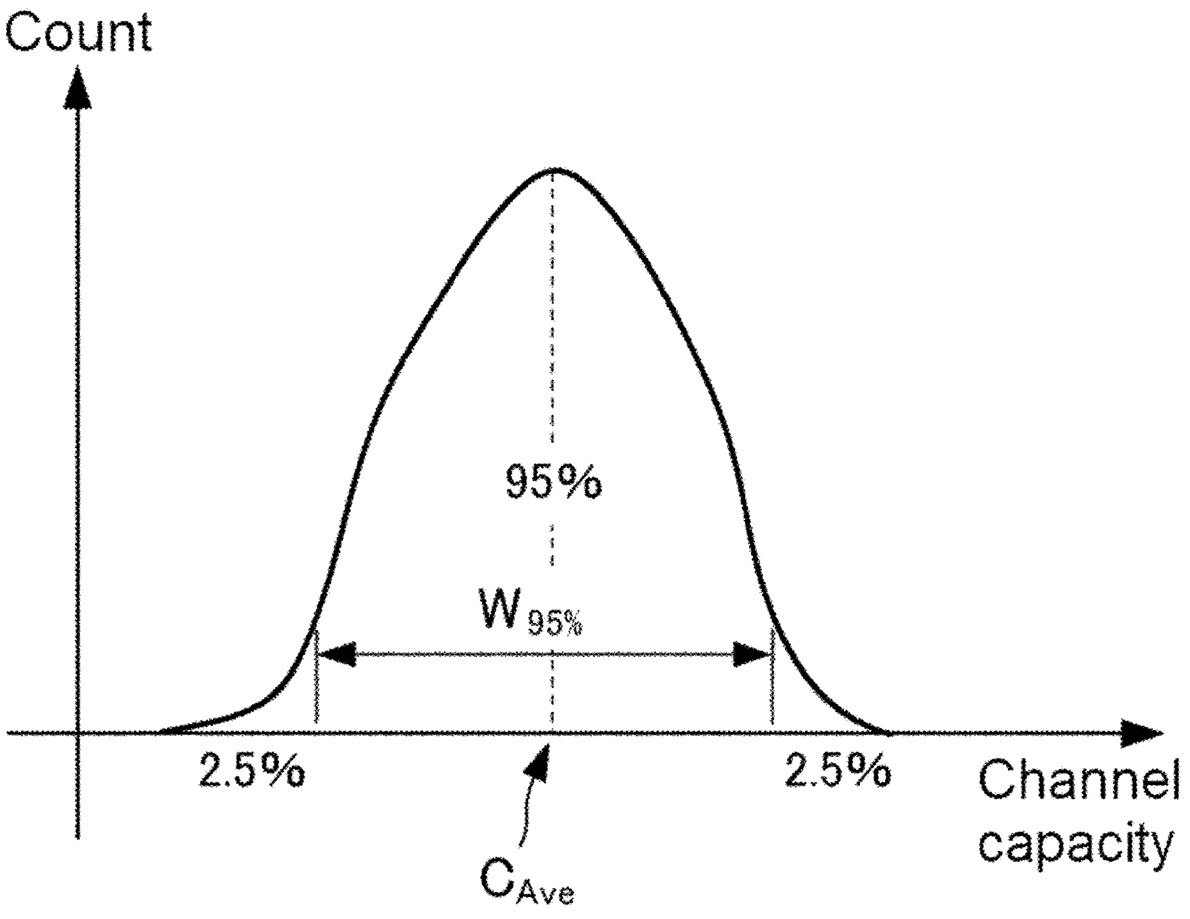
FIG. 3 is a graph schematically illustrating a probability distribution of a channel capacity.

In general, the probability distribution of the channel capacity is as illustrated in the graph of FIG. 3. The channel capacity takes various values at each instant. In the graph of FIG. 3, an average value $C_{Ave}$ is the average value of the channel capacity. In addition, a width $W_{95\%}$ is a difference between the channel capacity, which is the maximum value, and the channel capacity, which is the minimum value, in a 95% confidence interval of the probability distribution of the channel capacity.

Hereinafter, $C_{AVE}$ and $W_{95\%}$ of the probability distribution of the channel capacity $C_0$ are respectively denoted by $C_{Ave(Org)}$ and $W_{95\%(Org)}$. In addition, $C_{Ave}$ and $W_{95\%}$ of the probability distribution of the simulation channel capacities $C_p$ are respectively denoted by $C_{Ave(Model)}$ and $W_{95\%(Model)}$. That is, the width $W_{95\%(Org)}$ of the probability distribution of the channel capacity $C_0$ is a difference between the maximum value and the minimum value of the probability distribution of the channel capacity $C_0$ in the 95% confidence interval. Similarly, the width $W_{95\%(Model)}$ Of the probability distribution of the simulation channel capacity $C_p$ is a difference between the maximum value and the minimum value of the probability distribution of the simulation channel capacity $C_p$ in the 95% confidence interval.

The degree-of-similarity evaluation unit 27 is configured to calculate, for example, a percentage display of a value obtained by dividing an absolute value of the difference between $C_{Ave(Org)}$ and $C_{Ave(Model)}$ by $C_{Ave(Org)}$ according to Expression (6), as an evaluation indicator.

$$\text{Evaluation index of average value} = 100 \times \frac{|C_{Ave(Mode)} - C_{Ave(Org)}|}{C_{Ave(Org)}} [\%] \tag{6}$$

In addition, the degree-of-similarity evaluation unit 27 is configured to calculate, for example, a percentage display of a value obtained by dividing an absolute value of the difference between $W_{95\%(Org)}$ and $W_{95\%(Model)}$ by $W_{95\%(Org)}$ according to Expression (7) as the evaluation indicator.

$$\text{Evaluation index in 95\% confidence interval} = 100 \times \frac{|W_{95\%(Model)} - W_{95\%(Org)}|}{W_{95\%(org)}} [\%] \tag{7}$$

The width of the probability distribution of the channel capacity used by the degree-of-similarity evaluation unit 27 is not limited to the width in the 95% confidence interval, and may be various other widths.

Figure 4:
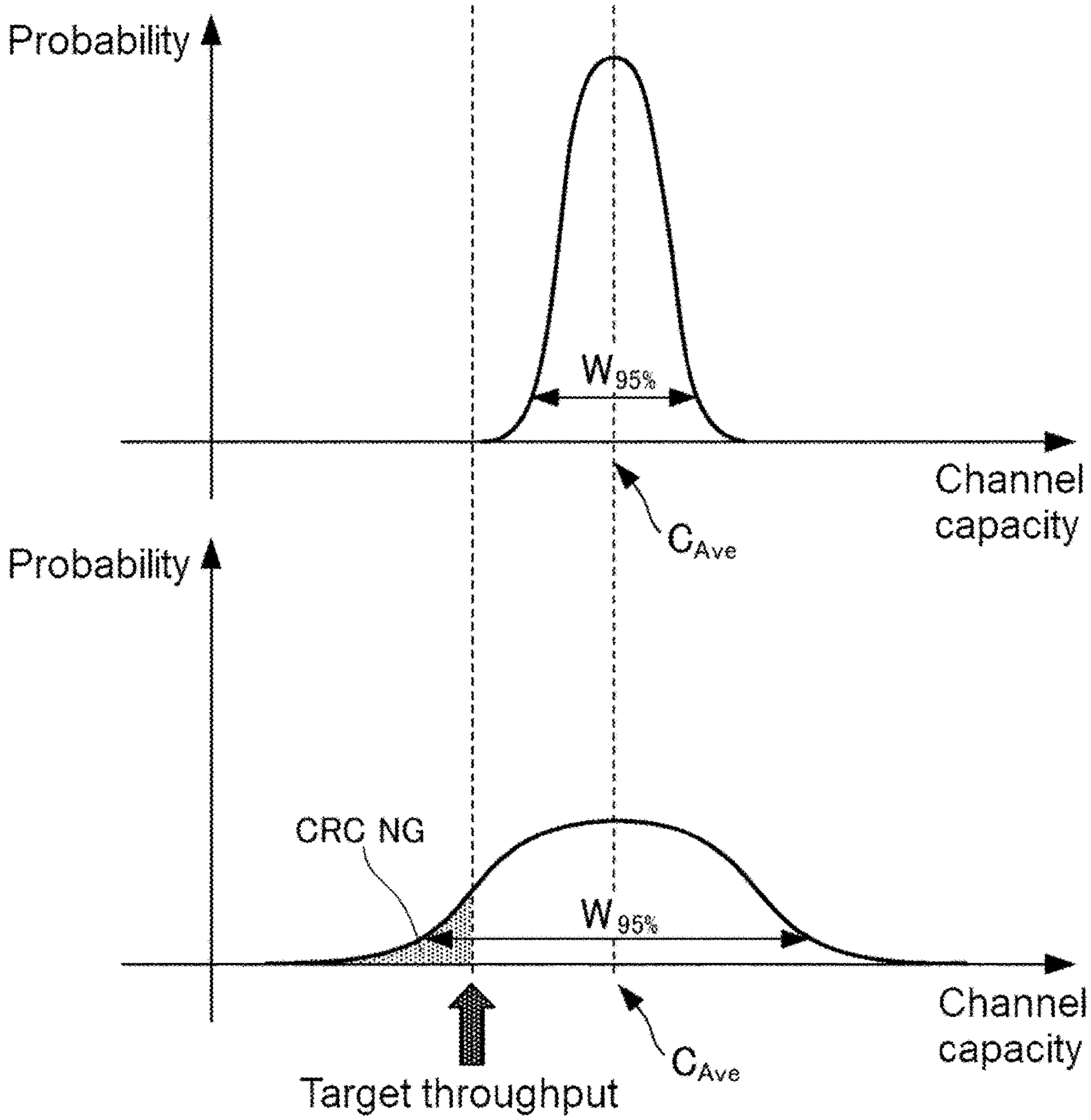
FIG. 4 is a graph illustrating a relationship between a target throughput, and an average value and a width of the probability distribution of the channel capacity.

FIG. 4 is a graph illustrating a relationship between a target throughput, and the average value and the width of the probability distribution of the channel capacity. The throughput is determined by a modulation method, an error correction method, a wireless resource allocation amount, and the like. It can be said that the channel capacity is an upper limit of a theoretical throughput and is an indicator indicating the expectation of the attainable throughput.

As illustrated in FIG. 4, even in a case where the average value $C_{Ave}$ of the probability distribution is the same, the channel capacity may be less than the target throughput depending on the size of the width $W_{95\%}$. In such a case, CRC NG, which is failure information on cyclic redundancy check (CRC) for error detection, is generated with the channel capacity less than the target throughput. That is, it is understood that both the average value and the width of the probability distribution of the channel capacity are important as the evaluation indicators of the degree-of-similarity evaluation unit 27.

The channel capacity evaluation unit 28 is not limited to the configuration for calculating the probability distribution as described above, and may calculate an average value or/and a standard deviation of the simulation channel capacity $C_p$, and an average value or/and a standard deviation of the actual propagation path channel capacity $C_0$ as the evaluation indicators, to evaluate the degree of similarity between the simulation channel capacity $C_p$ and the actual propagation path channel capacity $C_0$.

Hereinafter, an example of a method by which the channel model parameter calculation unit 22 calculates the channel model parameters of the TDL model, such as the "K factor", the "PDP", and the "antenna correlation matrix" will be described.

The estimation characteristics $\hat{H}_n^{ij}(k)$ are frequency characteristics having k as the index in the frequency direction, and can be represented by an impulse response $g_n^{ij}(m)$ including a plurality of delay taps $\tau_m$ corresponding to a plurality of paths. First, the channel model parameter calculation unit 22 calculates the impulse response $g_n^{ij}(m)$ in Expression (8) from the estimation characteristics $\hat{H}_n^{ij}(k)$ in Expression (2). Here, a generalized inverse matrix of the matrix A is represented by A+. M represents the number of delay taps, and m is an integer from 0 to M−1. The matrix A is a kind of Fourier transform matrix that can calculate a column vector having elements of the frequency characteristics by multiplying a column vector having elements of the impulse response in the time domain.

$$\begin{bmatrix} g_n^{ij}(0) \\ g_n^{ij}(1) \\ \vdots \\ g_n^{ij}(M-1) \end{bmatrix} = A^{\dagger} \begin{bmatrix} \hat{H}_n^{ij}(0) \\ \hat{H}_n^{ij}(1) \\ \vdots \\ \hat{H}_n^{ij}(K-2) \\ \hat{H}_n^{ij}(K-1) \end{bmatrix} = \tag{8}$$

$$\begin{bmatrix} e^{-j2\pi 0\cdot\Delta f\tau_0} & e^{-j2\pi 0\cdot\Delta f\tau_1} & \cdots & e^{-j2\pi 0\cdot\Delta f\tau_{M-1}} \\ e^{-j2\pi 1\cdot\Delta f\tau_0} & e^{-j2\pi 1\cdot\Delta f\tau_1} & \cdots & e^{-j2\pi 1\cdot\Delta f\tau_{M-1}} \\ \vdots & \vdots & \ddots & \vdots \\ e^{-j2\pi(K-2)\cdot\Delta f\tau_0} & e^{-j2\pi(K-2)\cdot\Delta f\tau_1} & \cdots & e^{-j2\pi(K-2)\cdot\Delta f\tau_{M-1}} \\ e^{-j2\pi(K-1)\cdot\Delta f\tau_0} & e^{-j2\pi(K-1)\cdot\Delta f\tau_1} & \cdots & e^{-j2\pi(K-1)\cdot\Delta f\tau_{M-1}} \end{bmatrix}^{\dagger} \begin{bmatrix} \hat{H}_n^{ij}(0) \\ \hat{H}_n^{ij}(1) \\ \vdots \\ \hat{H}_n^{ij}(K-2) \\ \hat{H}_n^{ij}(K-1) \end{bmatrix}$$

The K factor is a parameter representing a ratio between line-of-sight (LOS) power and non-line-of-sight (NLOS) power. As a method for calculating the K factor, for example, a method described in the following reference document can be used. The K factor can be calculated from Expression (9) of the following reference document by associating the impulse response $g_n^{ij}(0)$ of the first delay tap defined by Expression (8) with "V+v(t)" in Expression (1) of the following reference document.

Reference Document: L. J. Greenstein, et al, "Moment-Method Estimation of the Ricean K-Factor," in IEEE Communications Letters, Vol. 3, No. 6, pp. 175-176, June 1999

PDP is a parameter indicating power-delay characteristics of the averaged delay tap. The PDP normalized by the total power and expressed in dB units is calculated as in Expression (9).

$$P_{pdp}(m) = 10 \cdot \log_{10}\left(\frac{P_{tap}(m)}{\sum_{m=0}^{M-1} P_{tap}(m)}\right) \quad (9)$$

In Expression (9), $P_{tap}(m)$ is represented by Expression (10).

$$P_{tap}(m) = \frac{1}{N}\sum_{n=0}^{N-1}\sum_{i=1}^{R}\sum_{j=1}^{T}|g_n^{ij}(m)|^2 \quad (10)$$

It should be noted that, in a case where the NLOS component is separated from the LOS component to define the PDP for the first delay tap, $P_{tap}(0)$ is calculated by using the K factor $K_f$ as in Expression (11).

$$P_{tap}(0) = \frac{1}{K_f + 1}\frac{1}{N}\sum_{n=0}^{N-1}\sum_{i=1}^{R}\sum_{j=1}^{T}|g_n^{ij}(0)|^2 \quad (11)$$

The antenna correlation matrix is a matrix that represents how similar the propagation path characteristics $H_n^{ij}(k)$ of the plurality of channels constituting the actual propagation path 110 are to each other. In a case of 2×2 MIMO, the antenna correlation matrix for the m-th delay tap can be calculated, for example, as follows (the antenna correlation matrix can be calculated in the same manner even in a case of another antenna configuration).

First, the 2×2 MIMO propagation path matrix for the m-th delay tap is represented by Expression (12).

$$\begin{bmatrix} g_n^{11}(m) & g_n^{12}(m) \\ g_n^{21}(m) & g_n^{22}(m) \end{bmatrix} \quad (12)$$

A column vector $g_{stack}(m,n)$ that is generated by stacking column vectors included in the propagation path matrix in Expression (12) is defined as in Expression (13).

$$g_{stack}(m, n) = \begin{bmatrix} g_n^{11}(m) \\ g_n^{21}(m) \\ g_n^{12}(m) \\ g_n^{22}(m) \end{bmatrix} \quad (13)$$

The matrix that represents a correlation between the elements of the vector in Expression (13) is as in Expression (14).

$$R_{corr(org)}(m) = \frac{1}{N}\sum_{n=0}^{N-1} g_{stack}(m, n) g_{stack}(m, n)^{\dagger} \quad (14)$$

Here, $g_{stack}(m, n)^{\dagger}$ is conjugate transpose of $g_{stack}(m, n)$

Here, Expression (14) will be expressed in a matrix form as in Expression (15). The diagonal components of the matrix in Expression (15) are always real numbers, and the off-diagonal components are complex numbers.

$$R_{corr(org)}(m) = \begin{bmatrix} r_{11}^{(m)} & r_{12}^{(m)} & r_{13}^{(m)} & r_{14}^{(m)} \\ r_{21}^{(m)} & r_{22}^{(m)} & r_{23}^{(m)} & r_{24}^{(m)} \\ r_{31}^{(m)} & r_{32}^{(m)} & r_{33}^{(m)} & r_{34}^{(m)} \\ r_{41}^{(m)} & r_{42}^{(m)} & r_{43}^{(m)} & r_{44}^{(m)} \end{bmatrix} \quad (15)$$

The antenna correlation matrix $R_{corr}(m)$ is obtained by the calculation as in Expression (16) such that all diagonal components of the matrix in Expression (15) are 1.

$$R_{corr}(m) = \begin{bmatrix} \frac{1}{\sqrt{r_{11}^{(m)}}} & 0 & 0 & 0 \\ 0 & \frac{1}{\sqrt{r_{22}^{(m)}}} & 0 & 0 \\ 0 & 0 & \frac{1}{\sqrt{r_{33}^{(m)}}} & 0 \\ 0 & 0 & 0 & \frac{1}{\sqrt{r_{44}^{(m)}}} \end{bmatrix} R_{corr(org)}(m) \begin{bmatrix} \frac{1}{\sqrt{r_{11}^{(m)}}} & 0 & 0 & 0 \\ 0 & \frac{1}{\sqrt{r_{22}^{(m)}}} & 0 & 0 \\ 0 & 0 & \frac{1}{\sqrt{r_{33}^{(m)}}} & 0 \\ 0 & 0 & 0 & \frac{1}{\sqrt{r_{44}^{(m)}}} \end{bmatrix} = \begin{bmatrix} 1 & \frac{r_{12}^{(m)}}{\sqrt{r_{11}^{(m)} r_{22}^{(m)}}} & \frac{r_{13}^{(m)}}{\sqrt{r_{11}^{(m)} r_{33}^{(m)}}} & \frac{r_{14}^{(m)}}{\sqrt{r_{11}^{(m)} r_{44}^{(m)}}} \\ \frac{r_{21}^{(m)}}{\sqrt{r_{22}^{(m)} r_{11}^{(m)}}} & 1 & \frac{r_{23}^{(m)}}{\sqrt{r_{22}^{(m)} r_{33}^{(m)}}} & \frac{r_{24}^{(m)}}{\sqrt{r_{22}^{(m)} r_{44}^{(m)}}} \\ \frac{r_{31}^{(m)}}{\sqrt{r_{33}^{(m)} r_{11}^{(m)}}} & \frac{r_{32}^{(m)}}{\sqrt{r_{33}^{(m)} r_{22}^{(m)}}} & 1 & \frac{r_{34}^{(m)}}{\sqrt{r_{33}^{(m)} r_{44}^{(m)}}} \\ \frac{r_{41}^{(m)}}{\sqrt{r_{44}^{(m)} r_{11}^{(m)}}} & \frac{r_{42}^{(m)}}{\sqrt{r_{44}^{(m)} r_{22}^{(m)}}} & \frac{r_{43}^{(m)}}{\sqrt{r_{44}^{(m)} r_{33}^{(m)}}} & 1 \end{bmatrix} \quad (16)$$

The display unit 41 is configured by, for example, a display device such as a liquid crystal display (LCD) or a cathode ray tube (CRT), and displays a setting screen for performing settings related to test contents of the test system 1, a test result, the evaluation indicator for evaluating the degree of similarity between the probability distribution of the simulation channel capacity $C_p$ and the probability distribution of the actual propagation path channel capacity $C_0$, and the like, based on a display control signal from the signal processing unit 20. The display unit 41 may have an operation function such as a soft key on a display screen.

The signal processing unit 20 is, for example, configured by a control device such as a computer including a central processing unit (CPU), a graphics processing unit (GPU), a field programmable gate array (FPGA), a read only memory (ROM), a random access memory (RAM), a hard disk drive (HDD), and the like. In addition, the signal processing unit 20 can configure at least a part of the actual propagation path characteristic calculation unit 21, the channel model parameter calculation unit 22, the simulation channel capacity calculation unit 24, the actual propagation path channel capacity calculation unit 25, the probability distribution calculation unit 26, and the degree-of-similarity evaluation unit 27 as software by executing a predetermined program by the CPU or the GPU.

The above-described program is stored in the ROM or the HDD in advance. Alternatively, the above-described program may be provided or distributed in a state of being recorded on a computer-readable recording medium such as a compact disc or a DVD in an installable or executable form. Alternatively, the above-described program may be stored in a computer connected to a network such as the Internet, and provided or distributed by downloading the program via the network.

Figure 5:
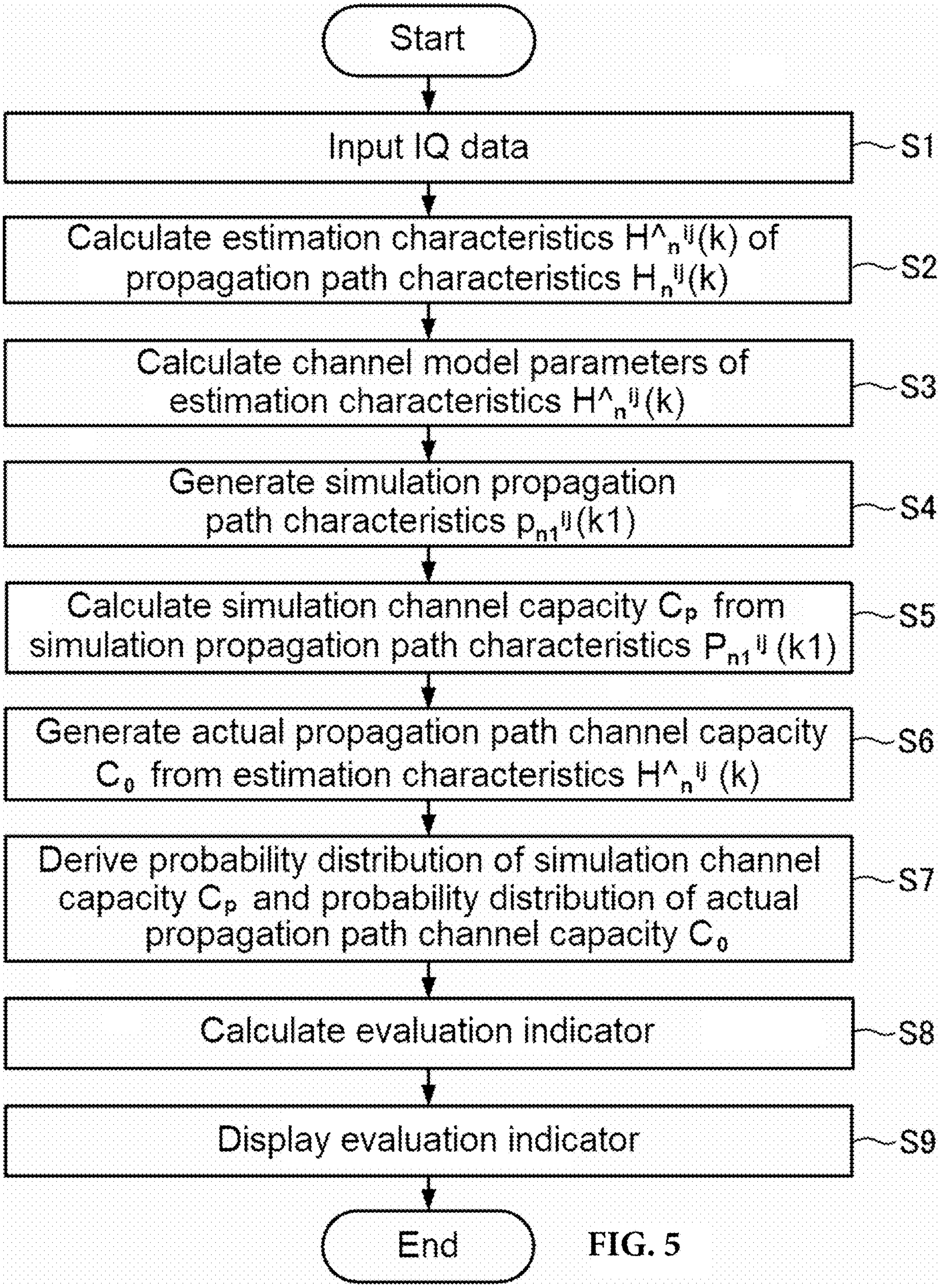
FIG. 5 is a flowchart illustrating a process of an evaluation method using the test system according to the embodiment of the present invention.

Hereinafter, an example of a process of an evaluation method using the test system 1 according to the present embodiment will be described with reference to the flowchart of FIG. 5. The descriptions that overlap with the descriptions of the configuration of the test system 1 will be appropriately omitted.

First, the IQ data obtained from the downlink signal is input to the signal processing unit 20 from the IQ data output unit 11 of the antenna device 10 (step S1).

Next, the actual propagation path characteristic calculation unit 21 uses the IQ data input in step S1, to calculate the estimation characteristics $\hat{H}_n^{ij}(k)$, at the plurality of analysis target timings $t_n$, of the propagation path characteristics $H_n^{ij}(k)$ of the one or more channels constituting the actual propagation path 110 (actual propagation path characteristic calculation step S2).

Next, the channel model parameter calculation unit 22 calculates the channel model parameters characterizing the statistical properties of the estimation characteristics $\hat{H}_n^{ij}(k)$ calculated in the actual propagation path characteristic calculation step S2 (channel model parameter calculation step S3).

Next, the simulation propagation path characteristic generation unit 30 generates the plurality of simulation propagation path characteristics $P_{n1}^{ij}(k1)$ according to the channel model parameters calculated in the channel model parameter calculation step S3 (simulation propagation path characteristic generation step S4).

Next, the simulation channel capacity calculation unit 24 calculates the simulation channel capacity $C_p$ of the plurality of simulation propagation path characteristics $P_{n1}^{ij}(k1)$ (simulation channel capacity calculation step S5).

Next, the actual propagation path channel capacity calculation unit 25 calculates the actual propagation path channel capacity $C_0$ of the estimation characteristics $\hat{H}_n^{ij}(k)$ at some plurality of analysis target timings $t_n$ (actual propagation path channel capacity calculation step S6).

Next, the probability distribution calculation unit 26 calculates the probability distribution of the simulation channel capacity $C_p$ calculated in the simulation channel capacity calculation step S5 and the probability distribution of the actual propagation path channel capacity $C_0$ calculated in the actual propagation path channel capacity calculation step S6 (probability distribution calculation step S7).

Next, the degree-of-similarity evaluation unit 27 calculates the degree of similarity between the probability distribution of the simulation channel capacity $C_p$ and the probability distribution of the channel capacity $C_0$, as the evaluation indicator (degree-of-similarity evaluation step S8).

Next, the signal processing unit 20 displays the evaluation indicator calculated in the degree-of-similarity evaluation step S8 on the display unit 41 (step S9).

The actual propagation path channel capacity calculation step S6 and the probability distribution calculation step S7 configure a channel capacity evaluation step of calculating the evaluation indicator for evaluating the degree of similarity between the simulation channel capacity $C_p$ and the actual propagation path channel capacity $C_0$.

As described above, the test system 1 according to the present embodiment is configured to calculate the channel model parameters characterizing the statistical properties of the estimation characteristics $\hat{H}_n^{ij}(k)$ obtained in the environment of the actual propagation path 110. As a result, the test system 1 according to the present embodiment can generate the simulation propagation path characteristics $P_{n1}^{ij}(k1)$ from the channel model parameters characterizing the statistical properties of the estimation characteristics $\hat{H}_n^{ij}(k)$ without the restriction of the acquisition time of the downlink signal from the base station 100.

Further, the test system 1 according to the present embodiment can perform the test of the DUT 120 in a form in which the statistical propagation path characteristics of the actual propagation path 110 are reproduced by using the simulation propagation path characteristics $P_{n1}^{ij}(k1)$.

In addition, the test system 1 according to the present embodiment is configured to calculate the probability distribution of the channel capacity $C_0$ of the estimation characteristics $\hat{H}_n^{ij}(k)$ obtained in the environment of the actual propagation path 110 and the probability distribution of the simulation channel capacity $C_p$ of the simulation propagation path characteristics $P_{n1}^{ij}(k1)$ obtained from the channel model parameters characterizing the statistical properties of the estimation characteristics $\hat{H}_n^{ij}(k)$. Further, the test system 1 according to the present embodiment is configured to evaluate the degree of similarity between the probability distribution of the simulation channel capacity $C_p$ and the probability distribution of the actual propagation path channel capacity $C_0$.

As a result, the test system 1 according to the present embodiment can evaluate the degree of similarity between the simulation propagation path characteristics $P_{n1}^{ij}(k1)$ of the channel model and the actual estimation characteristics $\hat{H}_n^{ij}(k)$ by using the channel capacity. That is, the test system 1 according to the present embodiment can evaluate the validity of the process of calculating the parameters of the channel model by using the channel capacity as the indicator. It should be noted that, the estimation characteristics $\hat{H}_n^{ij}(k)$ are calculated by using the known RS signals included in the downlink signal, and thus the estimation accuracy is sufficiently good.

The test system 1 and the evaluation method according to the present embodiment can be mainly applied to the following two scenes.

Scene 1: Evaluation in a case of developing software for transforming the estimation characteristics $\hat{H}_n^{ij}(k)$ of the actual propagation path 110 into the channel model (investigation means such as whether there is a problem in an algorithm)

Scene 2: Evaluation as a means for a user using software that transforms the estimation characteristics $\hat{H}_n^{ij}(k)$ of the actual propagation path 110 into the channel model to confirm the reliability of the transformation In a case where the test system 1 and the evaluation method according to the present embodiment are used in the scene 2, as a function of the software that transforms the estimation characteristics $\hat{H}_n^{ij}(k)$ of the actual propagation path 110 into the channel model, it is possible to evaluate the accuracy of the transformation each time the channel model is generated by an evaluation indicator indicating a deviation of the channel capacity. As a result, the user who uses the software can evaluate the mobile phone terminal while checking the degree of the difference between the channel model and the actual propagation path 110.

In addition, the test system 1 according to the present embodiment is configured to calculate the average value $C_{Ave(Org)}$ and the width $W_{95\%(Org)}$ of the probability distribution of the channel capacity $C_0$, and the average value $C_{Ave(Model)}$ and the width $W_{95\%(Model)}$ of the probability distribution of the simulation channel capacity $C_p$. As a result, the test system 1 according to the present embodiment can appropriately evaluate the degree of similarity between the simulation propagation path characteristics $P_{n1}^{ij}(k1)$ of the channel model and the actual estimation characteristics $\hat{H}_n^{ij}(k)$.

In the present embodiment described above, although the base station 100 is the network-side transmission/reception device that transmits the downlink signal to the actual propagation path 110, for example, an access point of Wi-Fi (registered trademark) may be used as the network-side transmission/reception device instead of the base station.

DESCRIPTION OF REFERENCE NUMERALS AND SIGNS

1 Test system
10 Antenna device
11 IQ data output unit
15 Test device
20 Signal processing unit
21 Actual propagation path characteristic calculation unit
22 Channel model parameter calculation unit
24 Simulation channel capacity calculation unit
25 Actual propagation path channel capacity calculation unit
26 Probability distribution calculation unit
27 Degree-of-similarity evaluation unit
28 Channel capacity evaluation unit
30 Simulation propagation path characteristic generation unit
41 Display unit
100 Base station (network-side transmission/reception device)
110 Actual propagation path
120 DUT
Rx1 to RxR Antenna
Tx1 to TXT Antenna

What is claimed is:

1. A test system comprising:

an actual propagation path characteristic calculation unit that uses IQ data, which is obtained from a downlink signal transmitted from a network-side transmission/reception device and which is output from an antenna device that receives the downlink signal in an environment of an actual propagation path, to calculate estimation characteristics, at a plurality of analysis target timings, of propagation path characteristics of one or more channels constituting the actual propagation path;

a channel model parameter calculation unit that calculates channel model parameters characterizing statistical properties of the estimation characteristics;

a simulation propagation path characteristic generation unit that generates a plurality of simulation propagation path characteristics according to the channel model parameters;

a simulation channel capacity calculation unit that calculates a channel capacity of the plurality of simulation propagation path characteristics;

an actual propagation path channel capacity calculation unit that calculates a channel capacity of the estimation characteristics at some analysis target timings among the plurality of analysis target timings; and a channel capacity evaluation unit that calculates evaluation indicators for evaluating a degree of similarity between the channel capacity of the plurality of simulation propagation path characteristics and the channel capacity of the estimation characteristics.

2. The test system according to claim 1, wherein the channel capacity evaluation unit includes a probability distribution calculation unit that calculates probability distribution of the channel capacity of the plurality of simulation propagation path characteristics and a probability distribution of the channel capacity of the estimation characteristics, and a degree-of-similarity evaluation unit that calculates a degree of similarity between the probability distribution of the channel capacity of the plurality of simulation propagation path characteristics and the probability distribution of the channel capacity of the estimation characteristics as the evaluation indicator.

3. The test system according to claim 2, wherein the degree-of-similarity evaluation unit calculates the evaluation indicator based on a difference between an average value of the probability distribution of the channel capacity of the plurality of simulation propagation path characteristics and an average value of the probability distribution of the channel capacity of the estimation characteristics, and the evaluation indicator based on a difference between a width of the probability distribution of the channel capacity of the plurality of simulation propagation path characteristics and a width of the probability distribution of the channel capacity of the estimation characteristics.

4. The test system according to claim 3, wherein the width of the probability distribution of the channel capacity of the plurality of simulation propagation path characteristics is a difference between a maximum value and a minimum value of a 95% confidence interval of the probability distribution of the channel capacity of the plurality of simulation propagation path characteristics, and the width of the probability distribution of the channel capacity of the estimation characteristics is a difference between a maximum value and a minimum value of a 95% confidence interval of the probability distribution of the channel capacity of the estimation characteristics.

5. An evaluation method comprising:

an actual propagation path characteristic calculation step of using IQ data, which is obtained from a downlink signal transmitted from a network-side transmission/reception device and which is output from an antenna device that receives the downlink signal in an environment of an actual propagation path, to calculate estimation characteristics, at a plurality of analysis target timings, of propagation path characteristics of one or more channels constituting the actual propagation path;

a channel model parameter calculation step of calculating channel model parameters characterizing statistical properties of the estimation characteristics;

a simulation propagation path characteristic generation step of generating a plurality of simulation propagation path characteristics according to the channel model parameters;

a simulation channel capacity calculation step of calculating a channel capacity of the plurality of simulation propagation path characteristics;

an actual propagation path channel capacity calculation step of calculating a channel capacity of the estimation characteristics at some analysis target timings among the plurality of analysis target timings; and a channel capacity evaluation step of calculating evaluation indicators for evaluating a degree of similarity between the channel capacity of the plurality of simulation propagation path characteristics and the channel capacity of the estimation characteristics.

6. The evaluation method according to claim 5, wherein the channel capacity evaluation step includes a probability distribution calculation step of calculating a probability distribution of the channel capacity of the plurality of simulation propagation path characteristics and a probability distribution of the channel capacity of the estimation characteristics, and a degree-of-similarity evaluation step of calculating a degree of similarity between the probability distribution of the channel capacity of the plurality of simulation propagation path characteristics and the probability distribution of the channel capacity of the estimation characteristics as the evaluation indicator.

7. The evaluation method according to claim 6, wherein, in the degree-of-similarity evaluation step, the evaluation indicator based on a difference between an average value of the probability distribution of the channel capacity of the plurality of simulation propagation path characteristics and an average value of the probability distribution of the channel capacity of the estimation characteristics, and the evaluation indicator based on a difference between a width of the probability distribution of the channel capacity of the plurality of simulation propagation path characteristics and a width of the probability distribution of the channel capacity of the estimation characteristics are calculated.

8. The evaluation method according to claim 7, wherein the width of the probability distribution of the channel capacity of the plurality of simulation propagation path characteristics is a difference between a maximum value and a minimum value of a 95% confidence interval of the probability distribution of the channel capacity of the plurality of simulation propagation path characteristics, and the width of the probability distribution of the channel capacity of the estimation characteristics is a difference between a maximum value and a minimum value of a 95% confidence interval of the probability distribution of the channel capacity of the estimation characteristics.

* * * * *